June 30, 1931.  G. E. McCREA  1,812,211
RETRACTABLE LANDING GEAR FOR FLYING MACHINES
Filed June 26, 1929
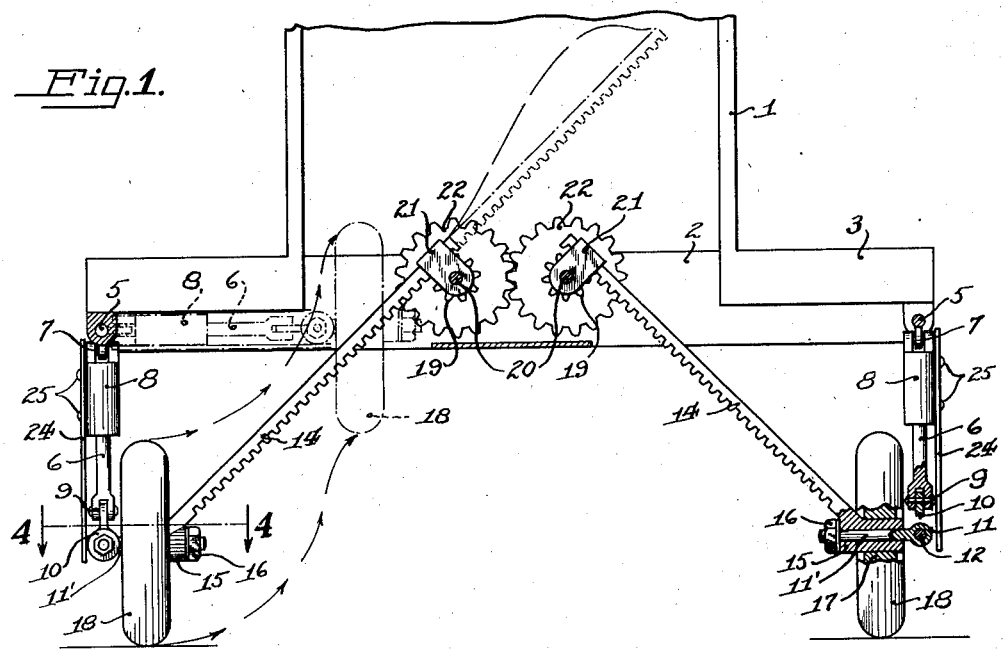
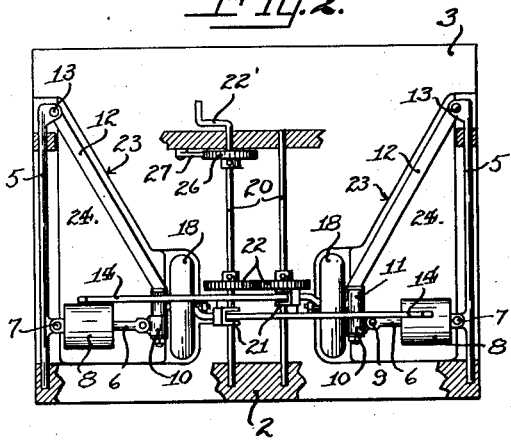
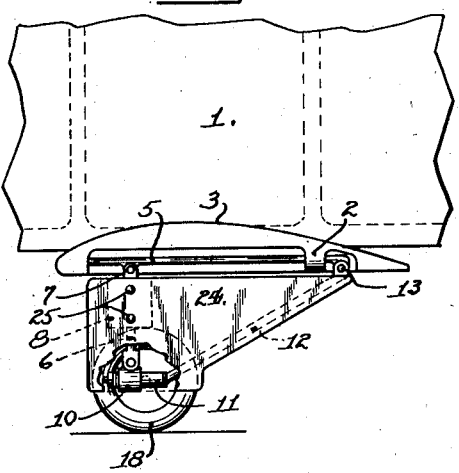
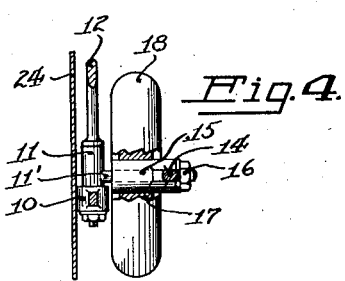
INVENTOR,
George E. McCrea,
BY  Booth & Booth
ATTORNEYS.

Patented June 30, 1931

1,812,211

UNITED STATES PATENT OFFICE

GEORGE E. McCREA, OF SAN FRANCISCO, CALIFORNIA

RETRACTABLE LANDING GEAR FOR FLYING MACHINES

Application filed June 26, 1929. Serial No. 373,709.

The present invention relates to landing gear for flying machines, and more particularly to means for retracting the landing gear to a position within or in close proximity to the surfaces of the plane.

The principal object of the invention is to lessen the parasitic resistance of the machine when in flight. A secondary object is to provide a simple and easily operated mechanism for retracting the landing gear without impairing its strength or flexibility when in operative position. A still further object is to provide an apparatus of the described type which will not interfere with the removal and replacement of the wheels or tires, when the landing gear is of the wheel type.

Although my invention is herein described and illustrated as applied to an airplane landing gear having wheels adapted for landing on the ground surface, it will be apparent that it may be embodied also in other types of landing gear, such as those equipped with skis or runners for landing upon snow and ice, or even with pontoons for landing upon water, and may be applied to other types of flying machines. It is to be understood, moreover, that the form, construction and arrangement of the several parts herein described and illustrated may be varied within the limits of the claims hereto appended, without departing from the spirit of the invention as expressed therein.

A preferred embodiment of the invention will now be fully described with reference to the accompanying drawings wherein:—

Fig. 1 is a part-sectional front elevation of my landing gear in operative position.

Fig. 2 is a sectional plan view of the same in retracted position.

Fig. 3 is a side elevation.

Fig. 4 is a sectional detail taken on the line 4—4 of Fig. 1.

In the drawings, the reference numeral 1 designates the frame or body of the fuselage of an airplane. 2 is a structure extending transversely across beneath the fuselage 1 and above the landing gear. The structure 2 is preferably made in the form of a plane or aerofoil, and may be of any desired transverse length or spread. As shown in the drawings, however, it is relatively short, having a transverse length approximately equal to the width of the landing gear, thus forming a short wing immediately beneath the fuselage. The wing structure 2 may be of any desired construction having a covering 3 of suitable exterior form.

At each side of the machine, a longitudinally disposed rod 5 is pivotally mounted upon the wing structure 2, and is preferably partly enclosed within the covering 3. The principal supporting strut 6 of the landing gear is pivoted, as shown at 7, to the rod 5 for swinging movement in a longitudinal direction. A spring or shock absorber 8 of any well known type is incorporated in the supporting strut 6, and the lower end of said strut is pivotally connected as at 9 with a trunnion member 10. The latter is journalled about a knuckle member 11, for movement in a transverse plane. A brace 12 has its end passed through and journalled within the knuckle member 11 and is extended upwardly and rearwardly to a pivotal connection at 13 with the rod 5.

The knuckle member 11 has an integral spindle 11' extending transversely inwardly. A retracting bar 14 is provided at its lower end with a cylindrical head 15 which is fitted over the spindle 11' and secured thereupon by a nut 16. The hub 17 of the landing wheel 18 is journalled upon the head 15 with any suitable form of bearing not shown in the drawings. The retracting bar 14 extends transversely and diagonally upward into the fuselage 1 and is provided throughout the greater portion of its length with gear teeth forming a rack, adapted for engagement with a pinion 19 secured upon a longitudinally disposed shaft 20 rotatably mounted in the lower portion of the fuselage. A suitable guide 21 holds the rack bar 14 in engagement with the pinion 19. There is sufficient freedom in the guide 21, however, to permit slight fore-and-aft movement of the lower end of the bar 14 due to the action of the spring 8.

The mechanism above described is duplicated on the other side of the machine, as shown in the drawings. The two shafts 20 are interconnected by gears 22, and one of said shafts is provided with conveniently located means for rotating it, indicated in Fig. 2, as a crank 22'. It will thus be apparent that by turning the crank 22', both rack bars 14 are drawn upwardly into the fuselage 1, thus swinging the two sides of the running gear structure inwardly and upwardly to the position indicated in dotted lines on one side of Fig. 1. It will be observed also that the wheels 18 remain approximately vertical throughout the swinging movement of their supporting structures.

The covering 4 of the underside of the wing 2 is cut away, as shown at 23, in Fig. 2, to permit the supporting strut 6, the brace 12 and their associated and connecting parts to recede into the interior of said wing. The wheel 18, occupying a vertical position when retracted, projects below the bottom of the wing 2, and also above it into the interior of the fuselage 1. An apron 24 is secured to the outside of the landing gear structure preferably by being connected with the shock absorber 8, as shown at 25. When the structure is retracted into the wing 2, the apron 24 entirely covers it and completes the lower surface of said wing, except for the relatively small aperture through which the lower portion of the wheel 18 projects.

It will be observed that when the landing gear is retracted, the wing 2 presents a nearly unbroken surface, the only projection being that of the lower portion of the wheels 18. The wing 2 being formed as an aerofoil, practically its entire surface is therefore utilized for lifting, and the parasitic resistance of the landing gear is reduced to a negligible quantity. The projection of the lower portion of the wheels 18 is an advantage outweighing the very slight parasitic resistance caused thereby, for the reason that said wheels, even in their retracted position, are still operative and provide some degree of safety in the event of a landing while the gear is retracted. Although in this position, the springs or shock absorbers 8 are inoperative, nevertheless the resilience of the tires of the wheels would permit a safe landing to be made.

It will also be observed that the jointed construction of the landing gear provides the necessary flexibility to allow the spring 8 to function properly. Furthermore, the landing gear, when in extended or operative position, is adequately braced to provide the necessary strength, both by the brace 12 and the rack bar 14. Suitable means are provided for locking the operating shafts 20 to prevent their rotation except when desired, as indicated by a toothed wheel 26 and latch 27 in Fig. 2.

A further point to be noted is that the wheels or tires may be removed or replaced without dismantling the entire landing gear. To remove the wheel 18 or a tire therefrom, it is only necessary to unscrew the nut 16 and slide the spindle 11' out of the head 15 on the lower end of the rack bar 14. The wheel may then be removed from said head.

I claim:—

1. In a flying machine, a supporting structure; a pair of spaced landing wheels; a frame connecting each landing wheel with said structure; and means for swinging said frames toward each other and upwardly to substantially horizontal positions in proximity to said structure, said wheels remaining substantially vertical during the movement of said frames.

2. In a flying machine, a supporting structure; a landing member; a frame pivotally connecting said landing member with said structure; and means for swinging said frame transversely from a substantially vertical position to a substantially horizontal position in proximity to said structure, said landing member being operative for ground contact in both positions of said frame.

3. In a flying machine, a supporting structure; a longitudinally disposed substantially vertical frame pivotally connected therewith; a landing member carried by said frame; a transverse bar connected with the lower portion of said frame and extending upwardly to said structure, said bar having a toothed rack formed thereon; a pinion engaging said rack; and means for rotating said pinion to swing said frame to a substantially horizontal position.

4. In a flying machine, a supporting structure; a pair of spaced substantially vertical frames pivotally connected therewith; landing members carried by said frames; a bar connected with the lower portion of each frame, said bars extending upwardly toward each other and being provided with toothed racks; pinions engaging said racks; and means interconnecting said pinions for simultaneous operation.

5. In a flying machine, a supporting structure; a frame pivotally connected therewith, said frame comprising a resilient weight supporting member, a brace member and a knuckle member connecting the lower ends of said weight supporting and brace members; a bar connected with said knuckle member and extending upwardly to said structure; means for retracting said bar to swing said frame upwardly; and a landing wheel journaled about said knuckle member.

6. In a flying machine, a supporting structure; a frame pivotally connected therewith, said frame comprising a weight supporting member, a brace member, and a knuckle member pivotally connected with and joining the lower ends of said weight supporting and brace members; a bar detachably connected to said knuckle member and extending upwardly to said structure; means for swinging said frame upwardly and retracting said bar; and a landing member carried by said knuckle member.

In testimony whereof I have signed my name to this specification.

GEORGE E. McCREA.